UNITED STATES PATENT OFFICE.

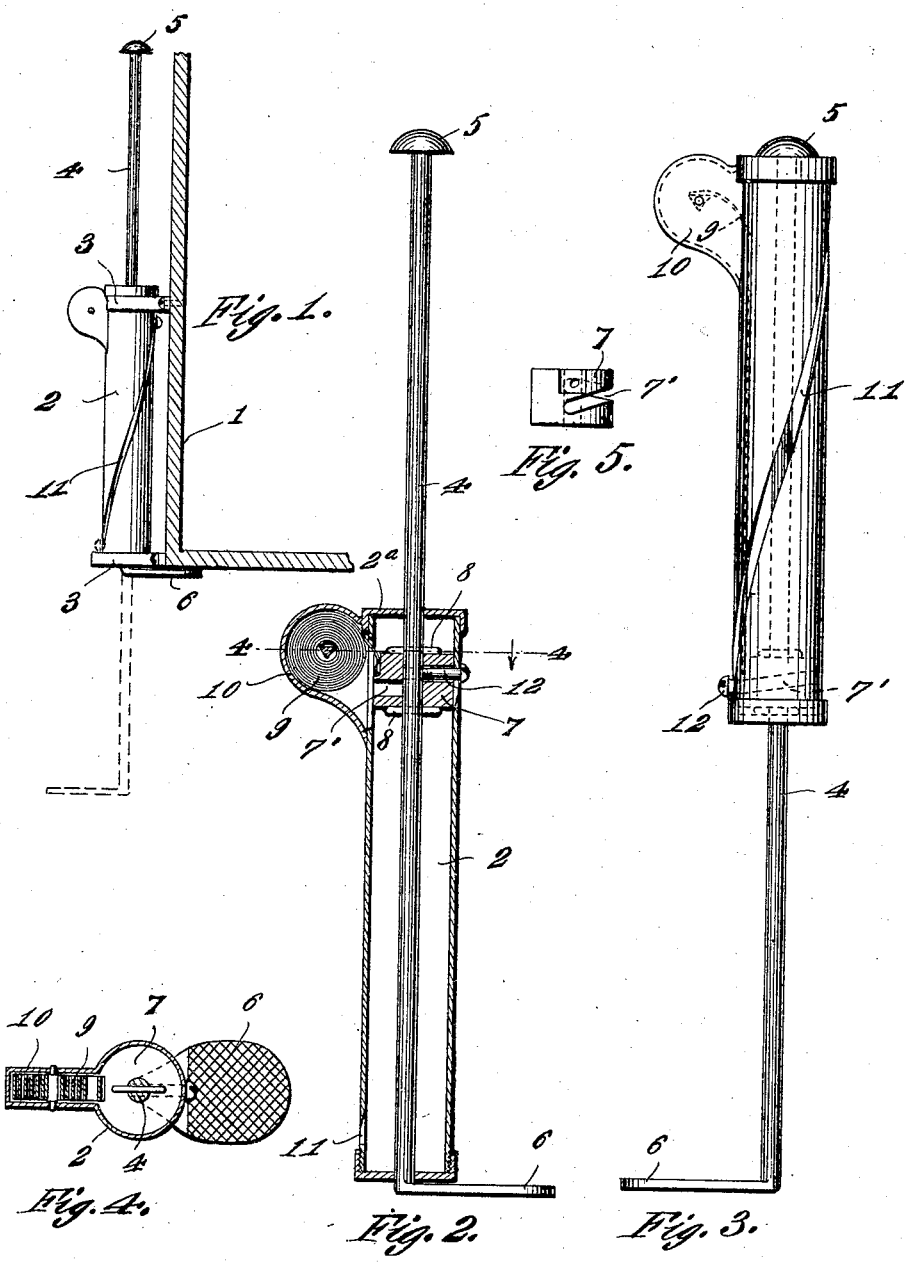

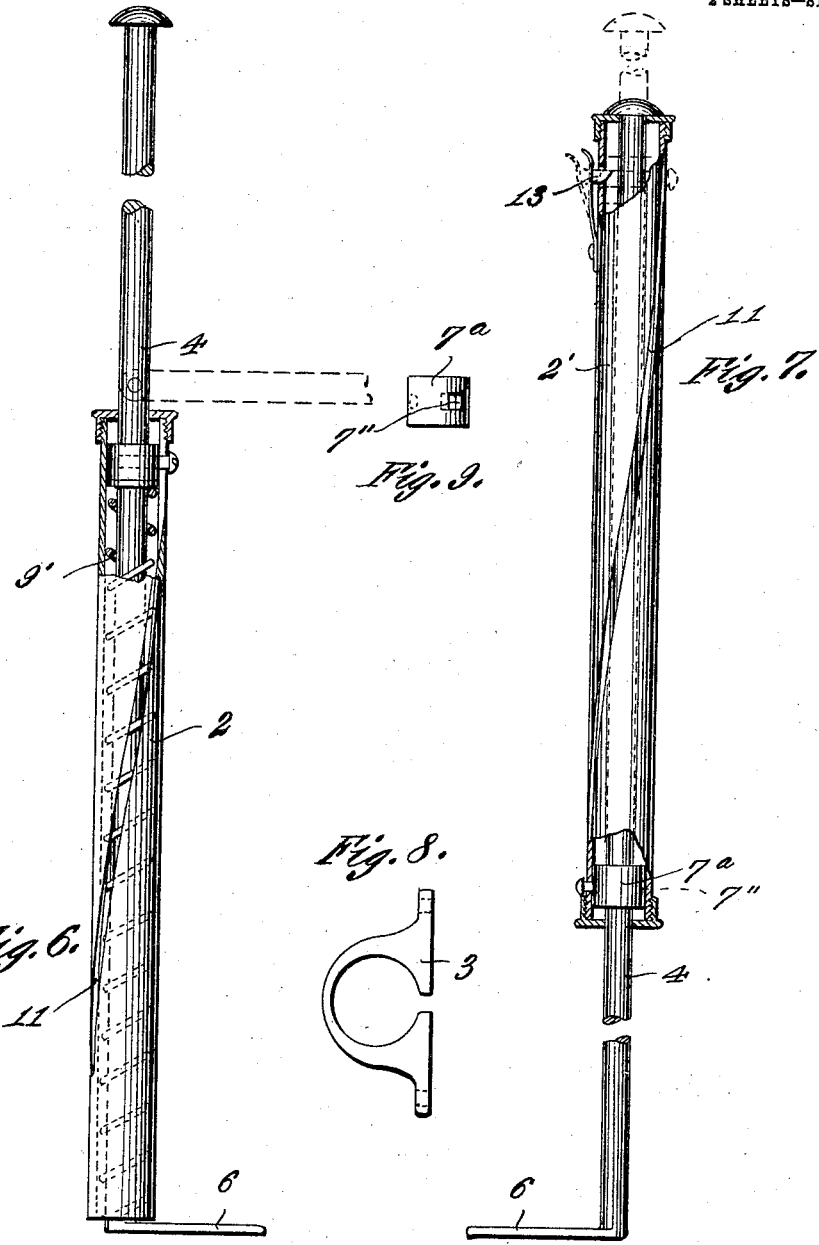

GEORGE P. H. NELSON, OF LAKE PROVIDENCE, LOUISIANA.

VEHICLE-STEP.

966,043.

Specification of Letters Patent.   Patented Aug. 2, 1910.

Application filed June 10, 1909.   Serial No. 501,386.

*To all whom it may concern:*

Be it known that I, GEORGE P. H. NELSON, a citizen of the United States, residing at Lake Providence, in the parish of East Carroll and State of Louisiana, have invented certain new and useful Improvements in Vehicle-Steps, of which the following is a specification.

This invention relates to vehicle steps and consists broadly in the provision of a step which when in operative position projects from a vehicle or similar support in the customary manner and to facilitate entrance to or mounting the vehicle, but which is adapted to be arranged in an inoperative position, wherein it is out of the way and does not form a projecting part. A step of such construction is especially advantageous for use on vehicles that have to travel over deep ruts, stumps of trees, or similar obstacles, since there is no likelihood of hanging the step or breaking the same.

In a further adaptation of the invention, the same comprises a step constructed so as to automatically assume an inoperative position after it has been used, and for purposes before referred to.

A step embodying the invention is also of great advantage for use on road or similar machines where several steps are required, and because the present step construction permits of the inoperative adjustment of the device.

For a full understanding of the invention, reference is to be had to the accompanying drawings, in which:

Figure 1 is a side elevation showing the invention applied to the side portion of a buggy, the step being disposed in inoperative position and shown in dotted lines in operative position; Fig. 2 is a vertical sectional view; Fig. 3 is a side elevation, the step being shown in operative position, or depressed; Fig. 4 is a section on the line 4—4 of Fig. 2; Fig. 5 is a side view of the guide block; Fig. 6 is a side elevation, shown partly in section, of a modification; Fig. 7 is a view similar to Fig. 6 and of another modification; Fig. 8 is a top view of one of the bracket supports for the step; and Fig. 9 is a side elevation of the guide block used in the construction illustrated in Fig. 7.

Similar reference characters refer to like parts throughout the description and drawings.

In the drawings the numeral 1 denotes the side of a buggy or any other equivalent support and on which the step comprising the invention is mounted. The step consists of a tubular supporting member 2 secured to the vehicle 1 by means of brackets 3 and in said tubular member 2 is mounted the step-rod 4, having at the upper end thereof a handle 5. At its lower end, the rod 4 is formed with the step arm 6 or tread-piece, the rod 4 being of a sufficient length to permit of considerable vertical movement of the tread-piece 6 or step proper.

On the rod or standard 4 is mounted a guide block 7 which slides vertically in the tubular member 2 and which is held in place on the standard 4 by keys 8 passing through said standard. The standard 4 is rotatable with respect to the parts 2 and 7 and connected with the guide block 7 is a spring 9 arranged in a casing 10 on the cap 2ª of the member 2, said spring normally tending to hold the guide block and standard 4 connected therewith in an uppermost position shown in Figs. 1 and 2 and wherein the step 6 is inoperatively arranged, being turned rearwardly so that it will project beneath the support 1 and out of the way. The tubular supporting member 2 has a spiral slot 11 in its side and projecting laterally from the standard 4 is a pin 12 that operates in the slot 11, and whereby when the spring 9 pulls the parts 4 and 7 upwardly the standard 4 will be rotated and the position of the step 6 reversed from that assumed thereby when operatively disposed. The guide member 7 does not rotate though the standard 4 turns therein and for this reason said member 7 is formed with a spiral slot 7' in a side thereof permitting the pin 12 to turn the standard 4 in the use of the device.

In using the invention, the standard 4 is depressed by the hand, or otherwise, and as it moves downwardly it is caused to turn and throw the step 6 into its projecting operative position as seen in dotted lines in Fig. 1. When pressure on the standard 4 is relieved the step is automatically returned to its inoperative position by the spring 9.

In Fig. 6 is illustrated a modification in which a coiled spring 9′ is employed in connection with the other parts of the invention to force the standard 4 upwardly to automatically throw the step into an inoperative position. The said spring 9′ is arranged in the tubular member 2, being interposed between the bottom of said member and the under side of the guide block on the standard 4.

In the modification illustrated in Fig. 7 the automatic means for rendering the step inoperative is dispensed with. In this instance, the standard 4 is free to gravitate to its lower position wherein the step projects into operative position. When, however, it is not desired to use the step, the standard 4 is raised and locked in its uppermost position, with the step 6 inoperatively disposed, by means of a catch 13 on the member 2′, said catch being adapted to engage in a notch 7″ in the guide block 7ª, as shown in Figs. 7 and 9. All that is necessary in order to drop the step in the construction of Fig. 7 is to pull outwardly on the catch 13.

It is to be understood that the construction of the parts which support the step may be modified considerably in carrying out the invention and I am not limited to the details of structure hereinbefore described and set forth in accomplishing the desired results to be attained in carrying out the operation of the invention.

As shown in Fig. 6 the upper end of the standard 4 may be jointed to permit of turning the same downwardly into an unobtrusive position when the step is raised.

Having thus described this invention, what is claimed as new is:—

1. In combination, a tubular supporting member, a standard vertically slidable therein, a head on the standard and in the supporting member, a coiled spring interposed between said head and the lower portion of the supporting member and normally tending to force the standard upwardly, a step projecting laterally from the lower end of the standard, the upper end of the standard being movable into a position above the tubular supporting member and forming a handle for operating the step, and a spiral slot and pin connection between the head and the supporting member for causing rotation of the step and the standard as the latter moves upwardly.

2. In combination, a supporting member, a step mounted thereon for vertical movement, spring means normally holding said step at the uppermost limit of its movement, and a spiral slot and pin connection between the step and the supporting member for turning the step into a non-projecting position when it moves upwardly.

In testimony whereof I affix my signature in presence of two witnesses.

GEORGE P. H. NELSON.

Witnesses:
W. E. Dunn,
J. C. Boss, Jr.